United States Patent Office 3,098,861
Patented July 23, 1963

3,098,861
METHOD OF PREPARING TITANIUM OR ZIRCONIUM BIS(DIOXY ALKYLENE) COMPOUNDS
Richard W. Russell, Berkeley, Calif., assignor to Stauffer Chemical Company, New York, N.Y., a corporation of Delaware
No Drawing. Filed Nov. 25, 1960, Ser. No. 71,413
4 Claims. (Cl. 260—429.3)

This invention relates to the preparation of titanium and zirconium containing compounds. More particularly, the present invention concerns a new method for preparation of organo-titanium and organo-zirconium compounds characterized by Ti—O—R or Zr—O—R chemical bonding arrangement. Such compounds contemplated by the present invention include alkyl titanates and alkyl zirconates. These particular compounds are characterized by a chemical bonding arrangement wherein each of the four primary valencies of the titanium atom or of the zirconium atom are satisfied by bonding through an oxygen atom to a carbon atom which is part of an organic radical.

While this invention will, for the sake of clarity and convenience, be described with particular reference to the zirconium compounds and more particularly the alkyl zirconates, it is to be understood that such description applies equally well, in all material respects, to the corresponding titanium compounds.

Among the objects of the present invention is to provide novel methods of synthesis for these types of compounds wherein cheaper starting materials are utilized.

Other and further objects of the present invention will become readily apparent from the following detailed discussion.

The present invention is based on the discovery that materials such as alkyl zirconates can be prepared by effecting a reaction between zirconium dioxide and an organic compound containing two or more hydroxyl groups per molecule. The preferred and most useful hydroxy containing compounds of the present invention contain two hydroxyl groups per molecule. The reaction proceeds in an alkaline media.

Heretofore, it has been known by those skilled in the art that alkyl titanates are readily hydrolized by water to ultimately yield titania and alcohol. The stated hydrolysis is presumed to be a two-stage process as follows:

$$Ti(OR)_4 + 4H_2O \rightarrow Ti(OH)_4 + 4ROH$$

followed by, $$Ti(OH)_4 \rightarrow TiO_2 + 2H_2O$$

As a result of the present invention, it has been found that such a reaction is reversible under alkaline conditions using either titania or zirconia to prepare alkyl titanates or alkyl zirconates respectively.

In the practice of the invention hydroxides of sodium, potassium and secondary amines have been found most useful as catalysts. Equally operative, however, are other alkali metal hydroxides, alkoxides, aroxides, and derivatives thereof which form alkoxides in the presence of alcohol.

Secondary amines are most effective although primary and tertiary amines, guanidines, and quaternary ammonium hydroxides have a catalytic effect as well.

In the practice of this invention zirconia obtained by treating a sodium or potassium zirconate with a mineral acid followed by dehydration in the presence of the alcohol has been found to be most preferable although zirconia prepared by other means can be utilized in the present invention.

It is apparent from the reaction which is the subject of the present invention:

$$ZrO_2 + 2R(OH)_2 \rightarrow Zr(O_2R)_2 + 2H_2O\uparrow$$

that to obtain the desired product the conditions must be such that water is removed from the reaction zone as it is formed. In the practice of the invention, this has been successfully accomplished by conducting the reaction in a reaction vessel connected to a modified Dean and Stark moisture test apparatus. A hydrocarbon solvent such as toluene or xylene is added to the reactants to form an azeotropic mixture with the water formed during reaction. In this manner a water-rich vapor phase from the above azeotropic mixture passes to a condenser in reflux position whereupon it condenses and the water is easily removed via the moisture trap. Methods of removing water from the reaction vessel, other than that described here, will readily suggest themselves to those skilled in the art.

As expressed in the reaction stated supra, a diol was used to form a spiro compound or one in which one atom is common to adjacent rings. Furthermore, at this point it would be well to point out that when alcohols containing a single hydroxyl group, for example, methanol and ethanol, were employed in the present reaction, no reaction occurred or, at least, there was negligible conversion to the alkyl zirconate.

In forming such spiro compounds using diols, other organo-zirconates will make up a part of the yield. This is due to formation of Zr—O—Zr linkages, thus forming chain like formations. Obviously, the particular diols selected will have a great effect on the products of the reaction. It has been found that when diols wherein the hydroxyl groups are separated by only two or three carbon atoms are employed in the reaction, the corresponding spiro compounds predominate in the yield. When diols wherein the hydroxyl groups are separated by more than three carbon atoms are used, predominately chain type compounds result and the yield in spiro compounds is quite low, if not negligible. Thus, when spiro compounds are desired, the preferred alcohol to be used in the reaction is a diol in which the hydroxyl groups are separated by only two or three carbon atoms.

However, each of the carbon atoms in the chain connecting the hydroxyl groups may have one or both of its hydrogen atoms substituted by a wide variety of groups, including aromatic groups and aliphatic groups containing up to as many as thirty carbon atoms or more, the properties of the resultant cyclic ester depending in part upon the nature of the substituent groups attached to the carbon atoms.

Also to be considered within the scope of this invention are polymeric products wherein zirconia is reacted with polyols, or compounds containing more than two alcoholic hydroxyl groups, such as for example, glycerol, cellulose, etc. to form polymeric materials in which different zirconium atoms are linked to different hydroxyl groups on one molecule of the polyol.

Such hydroxyl containing organic compounds are reacted directly with zirconia. One acceptable way to accomplish this is to prepare hydrated zirconia by hydrolysis at room temperature of zirconium salt solutions followed by filtrations and washing to remove soluble hydrolysis products such as acids or salts. The resulting hydrated zirconia pulp is then mixed with an excess of the stoichiometric amount of alcohol whose zirconate is desired, in the presence of an alkaline catalyst. The mixture is heated with the continual removal of water until the zirconia dissolves.

Solubilization of the zirconia is accomplished by reaction with the hydroxyl group containing compound. In some instances the organo-zirconates produced according to this procedure normally have slightly condensed structures containing Zr—O—Zr linkages to satisfy at least some of the zirconium valencies not satisfied by alkoxy groups as a part of the yield in addition to the production of molecules where the zirconium atom is bonded through oxygen to form $Zr(O_2R)_2$. The novel method of synthesis and products of this invention, therefore, also include partially condensed organo-zirconates, that is, polymeric products containing zirconium atoms linked together by oxygen atoms.

The reaction of the present invention may be accomplished under various pressures and temperatures. At atmospheric pressure, the lower operable temperature limit for this process is about 100° C., while the upper limit is probably the decomposition point of the alcohol whose zirconate is desired. At sub-atmospheric pressures, lower temperatures may be employed and at super-atmospheric pressures higher temperatures may be used.

The uses of these metal alkoxides are quite widespread. They are useful as an ingredient in heat-resistant paints and as paint driers and modifiers. They are also useful as water-repellant agents.

The following specific examples will serve to illustrate more clearly the nature of the invention and are not intended as limitations upon its scope.

*Example 1*

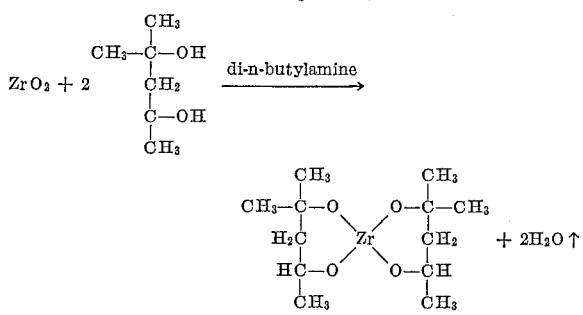

885 g. of hydrated zirconia, 800 ml. of 2-methylpentanediol-2,4 and 300 ml. of toluene were refluxed at atmospheric pressure. The condenser was fitted with a Dean-Stark type moisture trap to remove water from the system. 771.7 g. of water was removed to leave 113.3 g. of dehydrated zirconia in the reaction vessel. 32.4 g. (0.25 mole) of di-n-butylamine was added to the dehydrated mixture to catalyze the reaction. Refluxing was continued for 30 hours after the addition of the catalyst. Water of reaction was continually removed from the reaction zone via the moisture trap. The toluene, excess diol and di-n-butylamine was evaporated from the reaction vessel under reduced pressure to leave a tan colored, finely divided amorphous solid. Zirconium bis(2,4-dioxy-2-methylpentane) was recovered as a sublimate (S.P. 140°/10μ) in a 50% yield based on the weight of the dehydrated zirconia used.

*Example 2*

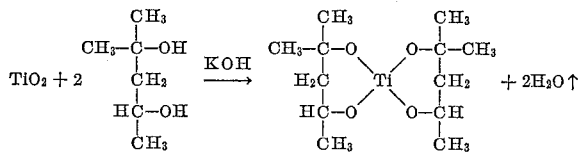

525 g. of hydrated titania, 500 ml. of 2-methylpentanediol-2,4 and 500 ml. of toluene was refluxed at atmospheric pressure. The condenser was fitted with a Dean-Stark type moisture trap to remove water from the system. 478 g. was removed to leave 47 g. of dehydrated titania in the reaction vessel. 15 g. of 86.2% KOH dissolved in 200 ml. of 2-methylpentanediol-2,4 was added to the reaction mixture and refluxing was resumed. After 12 hours under reflux the titania had dissolved. The toluene and excess diol were removed by distillation under reduced pressure. Titanium bis(2,4-dioxy-2-methylpentane) was recovered as a white amorphous solid in an 80% yield based on the weight of dehydrated titania used.

*Example 3*

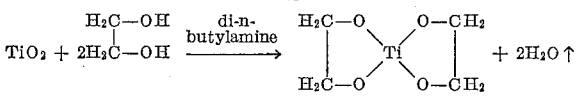

376 g. of hydrated titania, 400 ml. of ethanediol and 400 ml. of toluene were refluxed and water was removed via a Dean-Stark moisture trap. 30 ml. of di-n-butylamine and an additional 100 ml. of ethanediol was added to the dehydrated reaction mixture and refluxing was resumed. Water of reaction and 200 ml. of toluene were removed via the trap. In 7½ hours under reflux the titania had dissolved. Titanium bis(1,2-dioxyethane) was recovered as a distillation residue in the form of a white amorphous powder.

I claim:

1. A method of preparing organo-metallic compounds of the formula

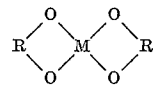

wherein M is a metal selected from the group consisting of titanium and zirconium and R is an alkylene radical, comprising: refluxing a material selected from the group consisting of titania and zirconia and an alkyl diol wherein the two hydroxyl groups therein are separated by a plurality of carbon atoms not exceeding three carbon atoms, removing water formed by the reaction from the reaction zone as it is formed, and recovering the organo-metallic compound thus formed.

2. The method of making zirconium bis(2,4-dioxy-2-methylpentane comprising refluxing 2-methylpentanediol-2,4 with zirconium dioxide while continuously removing water formed by the reaction from the reaction zone and collecting the product thus formed.

3. The method of making titanium bis(2,4-dioxy-2-methylpentane comprising refluxing 2-methylpentanediol-2,4 with titanium dioxide while continuously removing water formed by the reaction from the reaction zone and collecting the product thus formed.

4. The method of making titanium bis(1,2-dioxyethane) comprising refluxing ethanediol with titanium dioxide while continuously removing water formed by the reaction from the reaction zone and collecting the product thus formed.

References Cited in the file of this patent
UNITED STATES PATENTS
2,453,520    Langkammer _____ Nov. 9, 1948
FOREIGN PATENTS
789,566    Great Britain _____ Jan. 22, 1958